US012018629B2

(12) United States Patent
Caruel et al.

(10) Patent No.: US 12,018,629 B2
(45) Date of Patent: Jun. 25, 2024

(54) THRUST REVERSER COMPRISING A SINGLE ACTUATOR FOR CONTROLLING A MOBILE COWLING (71) Applicant: SAFRAN NACELLES, Gonfreville-l'Orcher (FR)

(72) Inventors: Pierre Charles Caruel, Moissy-Cramayel (FR); Fabien Charliac, Moissy-Cramayel (FR); Fabien Bravin, Moissy-Cramayel (FR); Loïc Chapelain, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 17/640,111

(22) PCT Filed: Sep. 2, 2020

(86) PCT No.: PCT/FR2020/051519
§ 371 (c)(1),
(2) Date: Mar. 3, 2022

(87) PCT Pub. No.: WO2021/044096
PCT Pub. Date: Mar. 11, 2021

(65) Prior Publication Data
US 2022/0333549 A1   Oct. 20, 2022

(30) Foreign Application Priority Data
Sep. 5, 2019   (FR) ...................................... 19 09767

(51) Int. Cl.
*F02K 1/76*   (2006.01)

(52) U.S. Cl.
CPC .................................. *F02K 1/763* (2013.01)

(58) Field of Classification Search
CPC ............... F02K 1/763; F02K 1/70; F02K 1/72
See application file for complete search history.

(56) References Cited

U.S. PATENT DOCUMENTS 2,938,335 A * 5/1960 Cook, Jr. .................. F02K 1/58
239/533.1
3,024,605 A * 3/1962 Nash ......................... F02K 1/60
239/265.19
(Continued)

FOREIGN PATENT DOCUMENTS

FR   2 382 593 A1   9/1978

OTHER PUBLICATIONS

International Search Report dated Dec. 1, 2020 in PCT/FR2020/051519 filed Sep. 2, 2020, 2 pages.
(Continued)

*Primary Examiner* — Ted Kim
(74) *Attorney, Agent, or Firm* — Oblon, McClelland, Maier & Neustadt, L.L.P.

(57) ABSTRACT

A thrust reverser for an aircraft propulsion assembly, this reverser including a mobile annular external structure, a single actuator for controlling the position of this mobile external structure and a device for guiding the mobile external structure when changing its position. The actuator and the guiding device are housed in a fairing of a pylon of the propulsion assembly to a wing or fuselage of the aircraft.

8 Claims, 7 Drawing Sheets (56) References Cited

U.S. PATENT DOCUMENTS

| | | | | |
|---|---|---|---|---|
| 3,419,218 | A | * | 12/1968 | Campbell ................. F02K 1/76 239/265.37 |
| 3,531,049 | A | * | 9/1970 | Hom ........................ F02K 1/60 60/229 |
| 3,581,841 | A | * | 6/1971 | Raynes .................... F02K 1/60 239/265.17 |
| 3,612,399 | A | * | 10/1971 | Rodgers ................... F02K 1/60 60/226.1 |
| 4,212,442 | A | | 7/1980 | Fage |
| 2011/0232406 | A1 | * | 9/2011 | Somerfield ............. F02K 1/763 74/424.81 |
| 2014/0061332 | A1 | * | 3/2014 | Dezeustre ................ F02K 1/64 239/265.19 |
| 2015/0176527 | A1 | * | 6/2015 | Todorovic ............... F02K 1/763 60/226.2 |
| 2016/0186688 | A1 | | 6/2016 | Mears et al. |

OTHER PUBLICATIONS

French Preliminary Search Report dated May 15, 2020 in French Patent Application No. 1909767 filed Sep. 5, 2019, 2 pages (with Translation of Category of Cited Documents).

* cited by examiner

THRUST REVERSER COMPRISING A SINGLE ACTUATOR FOR CONTROLLING A MOBILE COWLING

TECHNICAL FIELD

The invention relates to the field of thrust reversers for aircraft propulsion units, in particular cascade reversers. The invention relates more specifically to the system for activating and guiding an annular mobile external structure of such a reverser.

PRIOR ART

A cascade thrust reverser generally comprises a mobile external structure between a closed position and an open position. The movement of the mobile external structure between these positions generally consists in a translation of this structure along an axis substantially parallel to the axis of the engine.

In the closed position, the mobile external structure is configured to guide a flow of fluid in the propulsion unit towards an ejection nozzle so as to generate a thrust used to propel the aircraft.

In the open position, the mobile external structure releases a radial opening wherein the cascades are placed, so as to redirect a portion of the fluid flow forward of the propulsion unit and thus generate a braking counter-thrust.

Cascade reversers generally equip propulsion units equipped with a bypass turbojet engine. In such a propulsion unit, a primary flow circulates in a primary flow path passing through the gas generator of the turbojet engine and a secondary flow circulates in a secondary flow path surrounding the gas generator.

Such a reverser can be configured so that the fluid flow it redirects to produce the counter-thrust comprises either a portion of the secondary flow or a mixture of the primary and secondary flows.

In the latter case, it is known to use a mobile external structure of annular shape, that is to say comprising a circumferentially closed perimeter, which is possible given the positioning of this structure downstream of the propulsion unit, and in particular downstream of the portion of the propulsion unit which is fixed to the pylon.

Compared to the mobile external structures made of several separate cowlings, an annular mobile external structure allows in particular to reduce the disturbances in the flow of fluid generating the thrust when this structure is in the closed position, and to conduct the pressure forces via only tangential stresses in the structure.

The control of the position of such a mobile external structure is generally carried out by a plurality of actuators, and its guiding by guide means respectively distributed over the circumference of the propulsion unit.

A synchronisation defect of the actuators, for example in the event of one of these actuators seizing, can generate parasitic forces that hinder the movement of the mobile external structure and thus tend to damage the reverser and reduce the performance of the propulsion unit. This requires synchronising the actuators with each other, in particular by equipping them with ball screws.

In addition, the conventional systems for activating and guiding such a mobile external structure are relatively complex and increase the cost and the weight of the reverser.

DESCRIPTION OF THE INVENTION

The invention aims at simplifying the architecture of a thrust reverser as described above by overcoming all or part of the aforementioned drawbacks.

To this end, the object of the invention is a thrust reverser for an aircraft propulsion unit, this reverser comprising:
an annular external structure having a central longitudinal axis and being mobile in axial translation along this central longitudinal axis between a closed position, wherein said annular external structure is capable of guiding a flow of fluid in the propulsion unit so as to generate a thrust, and an open position wherein the mobile external structure releases a radial opening capable of evacuating a portion of said fluid flow from the propulsion unit so as to generate a counter-thrust,
a main guide device arranged to guide the mobile external structure during its movement between the closed and open positions.

According to the invention, this reverser comprises a single activator, such as an actuator, configured to move the mobile external structure between the closed and open positions, the activator and the main guide device both being located on the same side of a first median longitudinal plane and traversed by a second median longitudinal plane perpendicular to the first median longitudinal plane.

In other words, the movement of the mobile external structure is carried out only by this activator, without assistance from another actuator.

Controlling the position of the mobile external structure using a single activator simplifies the structure and operation of the reverser and reduces its weight and cost.

In particular, the invention thus allows to avoid the synchronisation problems encountered in conventional multi-actuator activation systems.

In this document, a median longitudinal plane is a fictitious plane that passes through the central longitudinal axis.

As a result, the activator and the main guide device are positioned circumferentially at the same level relative to each other.

This allows in particular to simplify the overall architecture of the means for controlling and guiding the mobile external structure.

In one embodiment, the main guide device may comprise a slide integral with one of the mobile external structure and a fixed structure of the reverser, the slide being configured to allow sliding of an element integral with the other of the mobile external structure and the fixed structure along this slide when the mobile external structure is moved between the closed and open positions.

Preferably, the slide may comprise two rails between which the activator is housed.

The positioning of guide rails on either side of the activator allows, during the movement of the mobile external structure by this activator, to avoid the application on this structure of a moment likely to hinder or block his movement.

This configuration also allows to reduce the overall size of the main guide device and the activator.

In one embodiment, the activator may be an actuator configured to place the mobile external structure in the open position when the actuator is retracted and to place the mobile external structure in the closed position when the actuator is deployed.

In a flight situation, the mobile external structure is subjected to aerodynamic forces requiring a greater force to move this structure from the open position to the closed position than in the opposite direction.

However, the force likely to be applied by an actuator is generally greater when it is deployed than when it is retracted, given the respective volume of the corresponding chambers.

Such an actuator configuration therefore allows to reduce its dimensions and therefore the weight of the reverser.

Preferably, a fixed portion of the actuator can be connected to a rear end of the slide.

In one embodiment, the reverser may comprise at least one auxiliary guide device arranged to guide the mobile external structure during its movement between the closed and open positions.

In the context of this embodiment, the main guide device is preferably arranged to guide the mobile external structure in concert with the auxiliary guide device during its movement between the closed and open positions.

Preferably, the auxiliary guide device can be positioned on one side of the first median longitudinal plane opposite to the side where the activator is located, the auxiliary guide device being able to be traversed by said second median longitudinal plane.

In other words, the auxiliary guide device can be positioned substantially opposite the activator and the main guide device relative to the central longitudinal axis of the mobile external structure.

Such an auxiliary guide device may in particular be of interest in a large-sized reverser, that is to say a reverser whose mobile external structure typically has a diameter greater than or equal to 1 m.

The presence of an auxiliary guide device opposite the main guide device and the activator allows to limit the deformations of this mobile external structure.

Such an auxiliary guide device is however optional in so far as the main guide device located at the activator can be sized to satisfactorily limit the phenomena of jamming or bracing, at least in a reverser of small or medium size wherein the mobile external structure typically has a diameter of less than 1 m.

In one embodiment, the reverser may comprise end-of-travel stops configured to axially hold the mobile external structure in the open position, one of said end-of-travel stops being located on the same side of the first median longitudinal plane as the activator and being centred relative to the second median longitudinal plane.

The invention also relates to an aircraft propulsion unit comprising a thrust reverser as defined above.

In one embodiment, the propulsion unit may comprise a pylon for attaching this propulsion unit to a wing or a fuselage of said aircraft, the pylon comprising a fairing sheltering the activator and the main guide device.

The invention also relates to an aircraft comprising at least one propulsion unit as described above.

Preferably, the aircraft may comprise two propulsion units as described above mounted on a rear portion of a fuselage of this aircraft.

Such a configuration allows in particular to reduce or cancel the impact of the activator and of the main guide device on the aerodynamic lines of the propulsion unit.

Such a configuration also allows to maximise the length of the slide of the main guide device and, consequently, to connect the fixed portion of the actuator to the rear end of this slide.

Other advantages and features of the invention will appear upon reading the detailed, non-limiting description which follows.

BRIEF DESCRIPTION OF THE DRAWINGS

The following detailed description refers to the appended drawings wherein.

DETAILED DESCRIPTION OF EMBODIMENTS

Each of the figures described below comprises a reference frame X, Y and Z respectively defining lateral, vertical and longitudinal directions.

Figure 1:
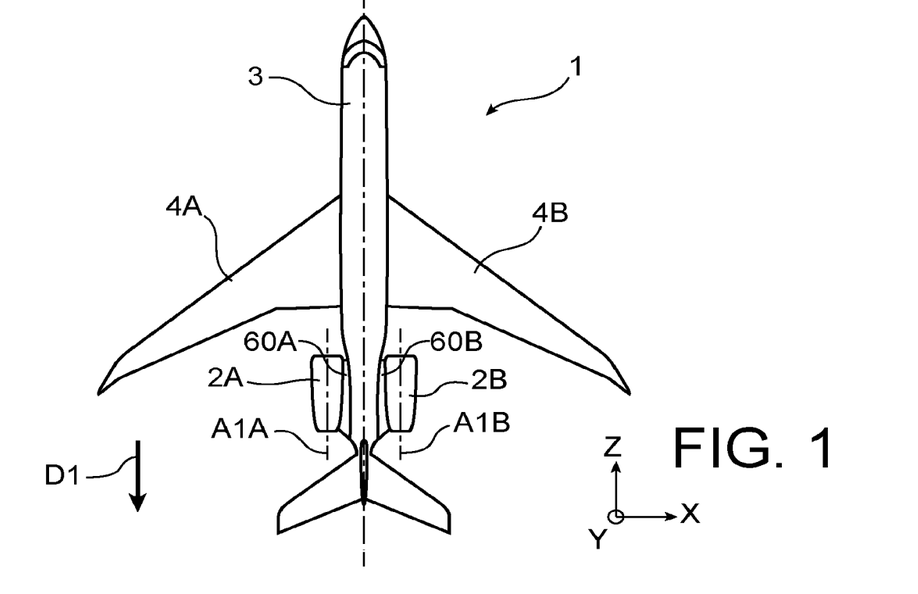
FIG. 1 is a schematic view of an aircraft in accordance with the invention.

FIG. 1 shows an aircraft 1 comprising two propulsion units 2A and 2B mounted via pylons 60A and 60B on the rear portion of the fuselage 3, downstream of the wings 4A and 4B.

In the present description, the terms "upstream", "downstream", "front" and "rear" are defined relative to a direction D1 of air flow relative to the aircraft 1 when the latter is propelled, the direction D1 being opposite to the direction of movement of the aircraft 1.

The propulsion units 2A and 2B each extend along a central longitudinal axis A1A, A1B substantially parallel to the longitudinal direction Z, so that the air and the gases passing through these propulsion units 2A and 2B and contributing to the propulsion of the aircraft 1 circulate in these units in the direction D1.

Figure 2:
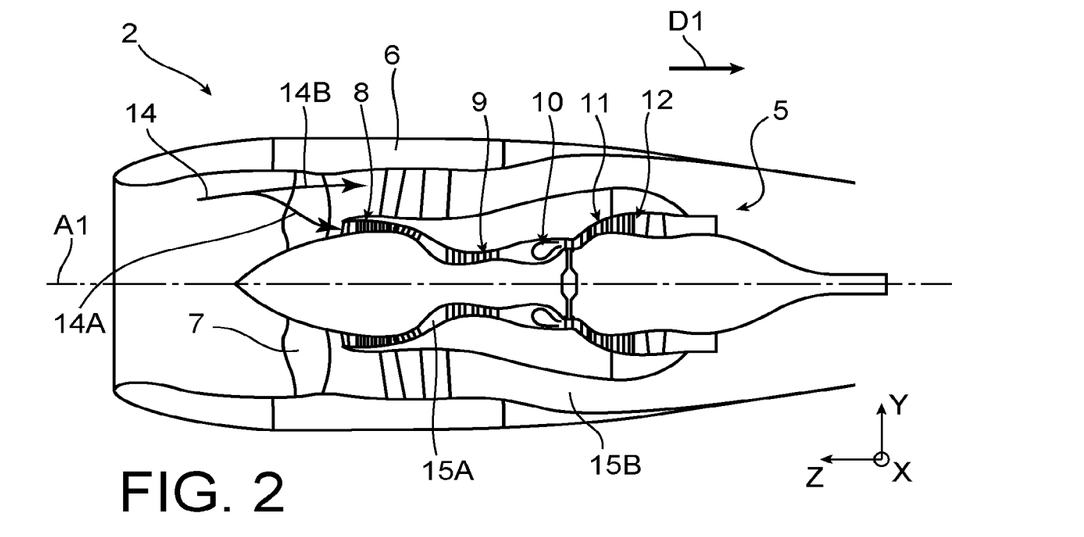
FIG. 2 is a schematic view in axial section of a propulsion unit in accordance with the invention.

In this example, each of the propulsion units 2A and 2B are similar to the propulsion unit 2 shown in FIG. 2.

In a manner known per se, the propulsion unit 2 of FIG. 2 comprises a turbomachine 5 faired by a nacelle 6. In this example, the turbomachine 5 is a two-spool, bypass turbojet engine.

The turbojet engine 5 has a central longitudinal axis A1 around which its various components extend, in this case, from the front to the rear of the turbojet engine 5, a fan 7, a low pressure compressor 8, a high pressure compressor 9, a combustion chamber 10, a high pressure turbine 11 and a low pressure turbine 12. The compressors 8 and 9, the combustion chamber 10 and the turbines 11 and 12 form a gas generator.

During operation of the turbojet engine 5, an air flow 14 enters the propulsion unit 2 via an air inlet upstream of the nacelle 6, passes through the fan 7 and then is divided into a central primary flow 14A and a secondary flow 14B. The primary flow 14A flows in a primary flow path 15A for the circulation of gases passing through the gas generator. The secondary flow 14B flows in a secondary flow path 15B surrounding the gas generator and delimited radially outwards by the nacelle 6.

Figure 3:
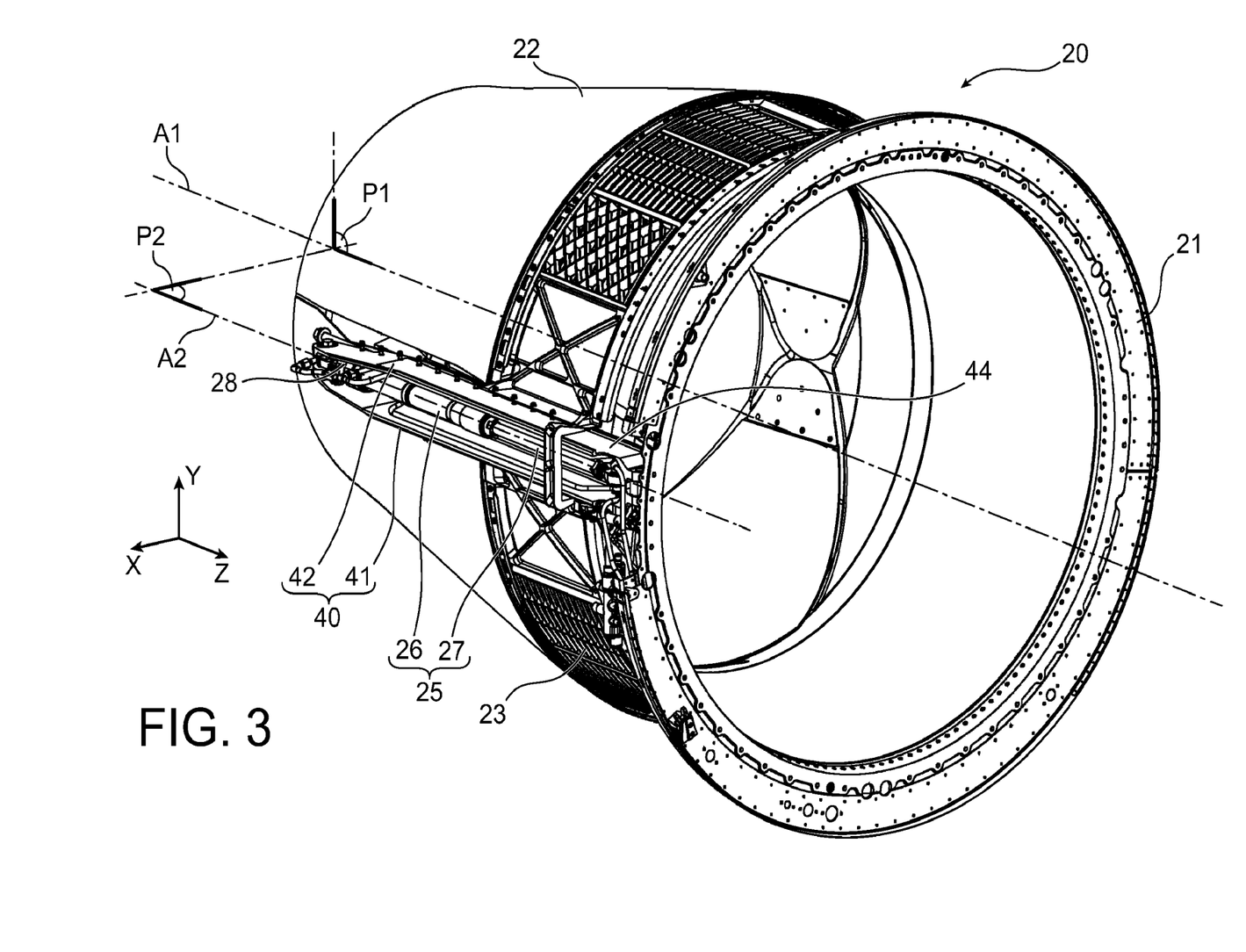
FIG. 3 is a schematic perspective view of a portion of a thrust reverser according to a first embodiment of the invention, this figure showing an actuator for controlling a mobile external structure of the reverser as well as a slide of a main guide device of this mobile external structure, the reverser being in a direct thrust configuration wherein the mobile external structure is in a closed position.
Figure 4:
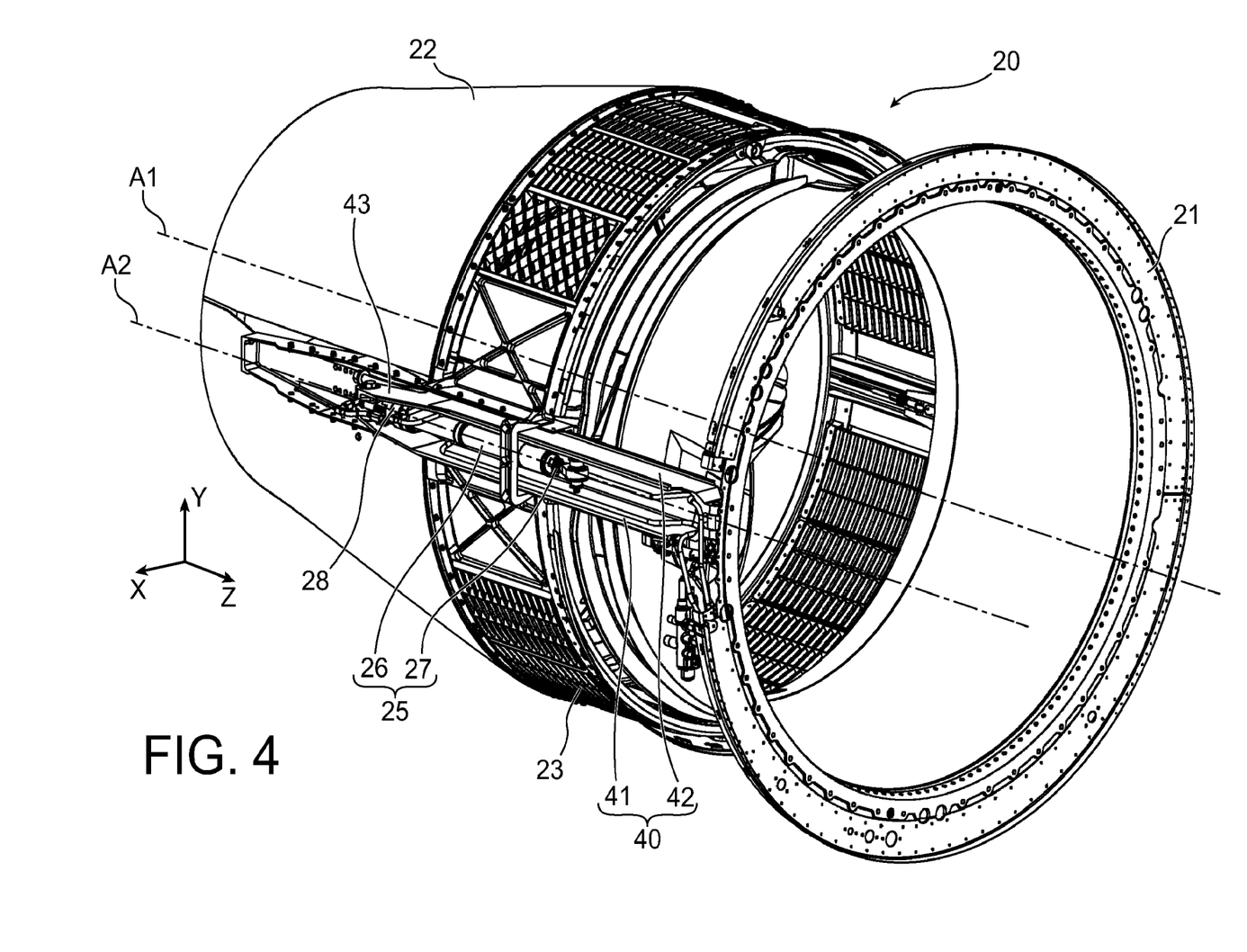
FIG. 4 is a schematic perspective view of the reverser of FIG. 3, the reverser being in a reverse thrust configuration wherein the mobile external structure is in an open position.

The invention relates more specifically to a thrust reverser 20 as illustrated in FIGS. 3 and 4, this reverser 20 having the function of reversing a portion of the thrust generated by such a propulsion unit 2 in order to brake the aircraft 1 when landing.

The reverser 20 can of course equip a propulsion unit different from that of FIG. 2 without departing from the scope of the invention.

With reference to FIG. 3, the reverser 20 comprises a fixed structure including in particular a front frame 21. In this example, the front frame 21 is intended in particular to connect the reverser 20 to the nacelle 6 of the propulsion unit 2, by attaching this front frame 21 to a rear frame (not shown) of the nacelle 6.

The reverser 20 moreover comprises a mobile external structure 22 forming a mobile cowling in axial translation along the axis A1 relative to the fixed structure 21.

The axis A1 here corresponds both to a central longitudinal axis of the reverser 20, to the central longitudinal axis of the turbojet engine 5 as well as to a central longitudinal axis of the propulsion unit 2.

The mobile external structure 22 is in this example an annular structure of axis A1 made in one piece.

The expression "annular structure" designates a structure comprising a circumferentially closed perimeter, that is to say a continuous structure over two pi radians, at least over a longitudinal portion of this structure 22.

The reverser 20 moreover comprises cascades 23 configured to direct the diverted flow of fluid forward of the propulsion unit 2 to generate the counter-thrust (see further below).

In the embodiment of FIGS. 3 and 4, the cascades 23 are integral with the mobile external structure 22. In an embodiment not shown, the cascades 23 are integral with the fixed structure of the reverser 20.

In this example, the thrust reverser 20 is intended to be mounted at the rear of the propulsion unit 2 so as to generate a counter-thrust from a mixed flow comprising a mixture of the primary 14A and secondary 14B flows exiting respectively the primary flow path 15A and the secondary flow path 15B of the propulsion unit 2.

FIG. 3 shows the reverser 20 in a direct thrust configuration, wherein the mobile external structure 22 is in a closed position, that is to say in an advanced position relative to the front frame 21 of the fixed structure.

In the closed position, the mobile external structure 22 contributes to guiding the primary 14A and secondary 14B flows towards an ejection outlet downstream of the propulsion unit 2 so as to generate thrust.

Figure 6:
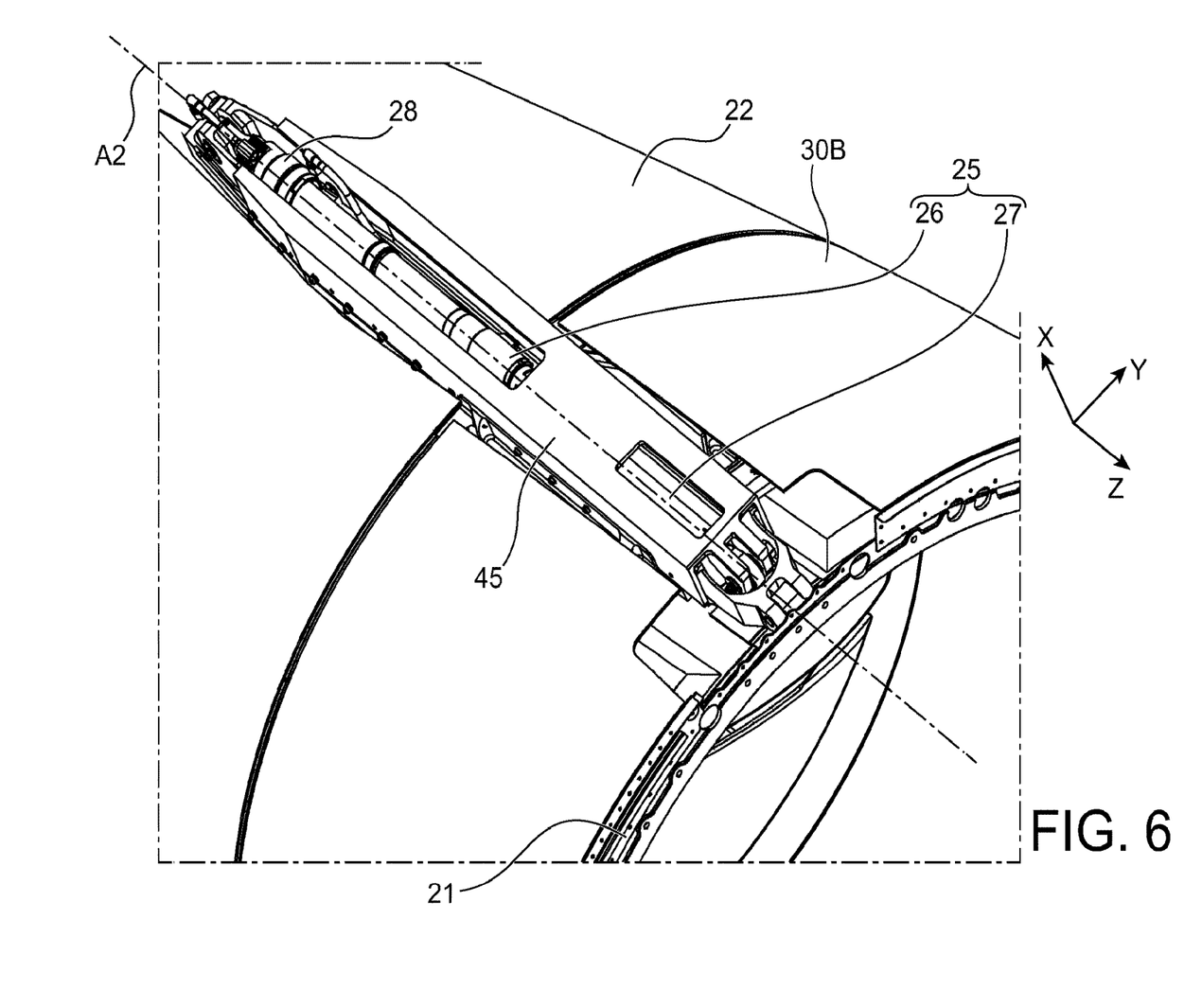
FIG. 6 is a schematic perspective view of the reverser of FIG. 3 in direct thrust configuration, this figure showing the sliding part of the main guide device as well as an external fairing covering the reverser cascades.
Figure 7:
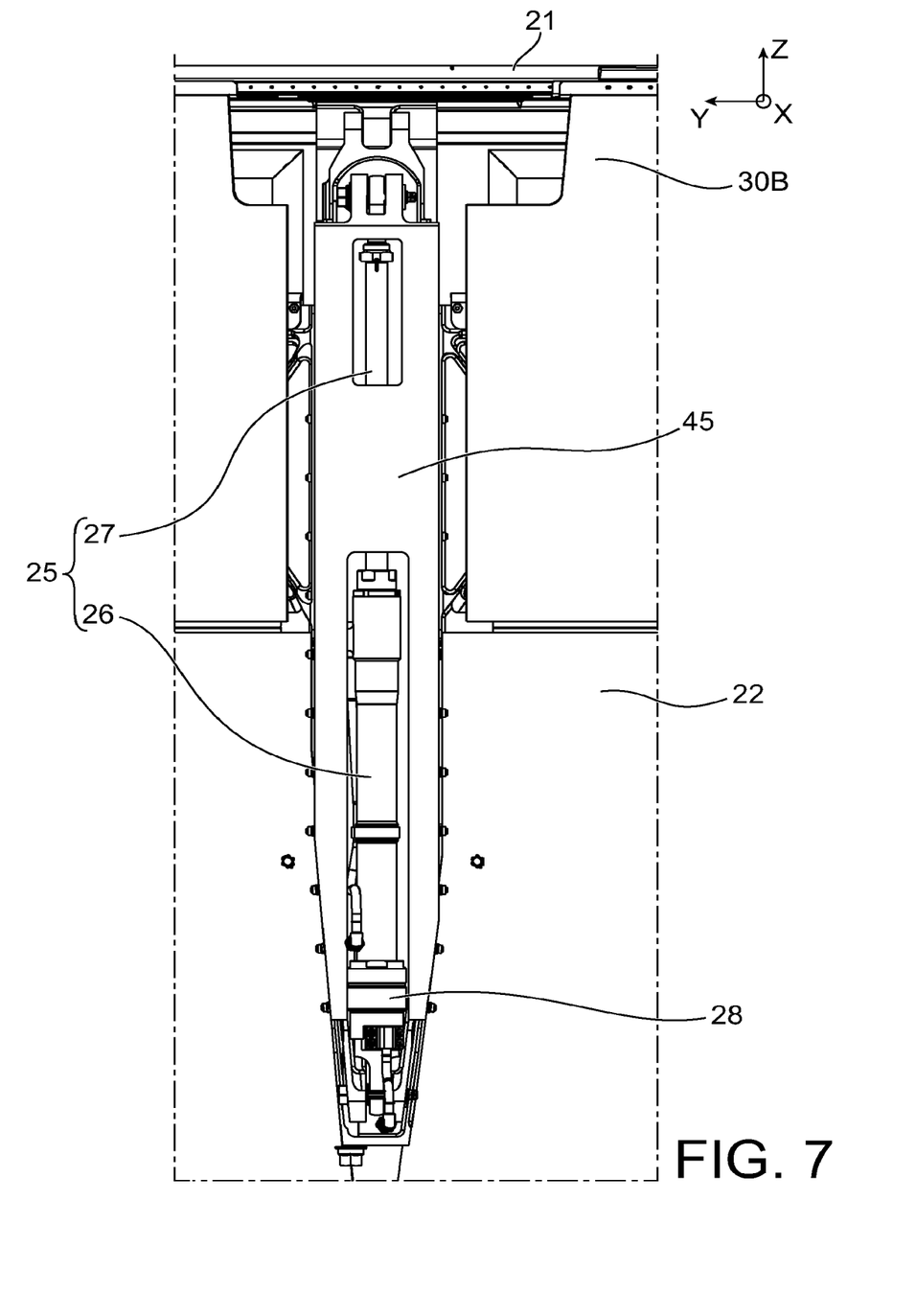
FIG. 7 is a schematic perspective view of the reverser of FIG. 3 in direct thrust configuration, this figure showing the sliding part of the main guide device as well as the external fairing covering the reverser cascades.

In the direct thrust configuration, the cascades 23 are covered, in this case radially on the inside by an internal structure 30A (visible in FIG. 8) and radially on the outside by an external fairing 30B (visible on FIGS. 6 and 7). This internal structure 30A and this external fairing 30B are integral with the front frame 21. The internal structure 30A is in particular configured to prevent the fluid circulating in the propulsion unit 2 from accessing the cascades 23 and therefore from exiting the propulsion unit 2 through the cascades 23.

FIG. 4 shows the reverser 20 in a thrust reversal configuration, wherein the mobile external structure 22 is in an open position, that is to say in a retracted position relative to the front frame 21 of the fixed structure.

In the open position, the mobile external structure 22 releases a radial opening allowing to evacuate the mixed flow in order to generate a counter-thrust.

Figure 8:
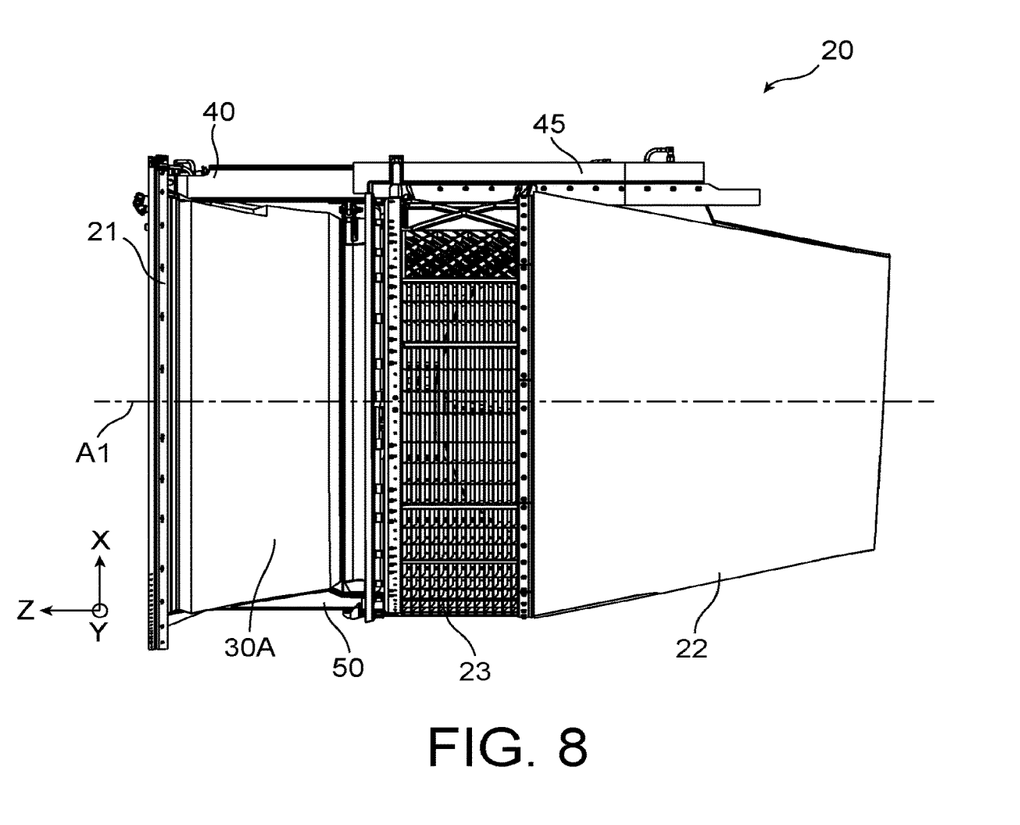
FIG. 8 is a schematic view of a portion of a thrust reverser according to a second embodiment of the invention which differs from the first embodiment in that it comprises an auxiliary guide device, the reverser being in thrust reversal configuration, this figure showing an internal fairing allowing to cover the cascades radially on the inside when the reverser is in direct thrust configuration.

In this example, the radial opening is constituted by openings of the cascades 23, it being understood that the space axially located between the cascades 23 and the front frame 21 remains closed off by the internal structure 30A and the external fairing 30B, since the latter are integral with the front frame 21 (see FIGS. 6 and 8).

In an embodiment not shown, the reverser 20 may not comprise cascades 23, the radial opening thus being able to be constituted by an empty space corresponding substantially to the space occupied by the cascades 23 in the embodiment of FIGS. 3 and 4.

The use of cascades 23 is generally preferable because said cascades allow to maximise the axial component of the flow at the exit from the radial opening and consequently to increase the counter-thrust force, typically taking into account the curved shape of the vanes (not shown) delimiting the openings of the cascades 23.

The reorientation of the primary 14A and secondary 14B flows towards the cascades 23 is carried out by any conventional means, for example using pivoting flaps (not shown) connected on the one hand to the mobile external structure 22 and on the other hand to the fixed structure of the reverser 20 so as to deploy radially in the propulsion unit 2 when the mobile external structure 22 is open and to retract when the latter is closed.

The movement of the mobile external structure 22 between the closed and open positions is carried out by a single activator 25.

With reference to FIG. 3, the activator 25 is an actuator extending along an activation axis A2 substantially parallel to the central longitudinal axis A1.

In a manner known per se, the actuator 25 comprises a body 26 forming a fixed portion of this actuator 25 and a rod 27 forming a mobile portion of this actuator 25.

The rod 27 is integral with a piston (not shown) housed in a cylindrical interior volume (not shown) of the body 26, the piston separating this cylindrical volume into two chambers which are hermetic and isolated from each other. The volume of these two chambers is not identical since one of them is traversed by the rod 27 connected to the piston.

The introduction of a pressurised fluid into the largest chamber, or large chamber, allows to move the piston and the rod 27 in a first direction of movement along the axis A2 causing the actuator 25 to be deployed. The introduction of a pressurised fluid into the smallest chamber, or small chamber, allows the movement of the piston and the rod 27 in a second direction of movement along the axis A2 causing the actuator 25 to be retracted.

The body 26 comprises two axial ends, in this case a front end located on the side of the rod 27 and a rear end opposite the front end.

With reference to FIGS. 3 and 4, the actuator 25 is configured to place the mobile external structure 22 in the open position when the actuator 25 is retracted and to place the mobile external structure 22 in the closed position when the actuator 25 is deployed.

For this purpose, the body 26 of the actuator 25 is in this example connected to the fixed structure of the reverser 20 by its rear end 28 and the actuator 25 is oriented towards the front of the reverser 20, that is to say towards the front frame 21. The free end of the rod 27, that is to say the end opposite to that which is connected to the piston, is in turn connected to a part 45 integral with the mobile external structure 22 (see further below).

Such a configuration of the actuator 25 allows to reduce its dimensions since the force supplied by this actuator during the pressurisation of the large chamber is used to close, over-retract and slow down the opening of the mobile external structure 22, while the force provided during the pressurisation of the small chamber is used to open the mobile external structure 22. The force required to close the mobile external structure 22 is indeed greater than the force required to open this structure 22, said structure being in particular subject to aerodynamic forces having an axial component oriented from upstream to downstream.

The guiding of the mobile external structure 22 during its movement between the closed and open positions is ensured by a main guide device comprising in this example a slide 40 formed by two rails 41 and 42 integral with the fixed structure of the reverser 20. The rails 41 and 42 are visible in FIGS. 3 to 5.

In this example, the rails 41 and 42 extend parallel to the activation axis A2, on either side of the actuator 25, so that the latter is housed between the rails 41 and 42.

More specifically, the actuator 25 is housed in the slide 40 over its entire length. On the one hand, the rear end 28 of the body 26 of the actuator 25 is connected to a rear end 43 of the slide 40 (see FIG. 4). On the other hand, the rails 41 and 42 are sized so as to extend on either side of the rod 27, including when the actuator 25 is deployed. When the actuator 25 is deployed, said free end of the rod 27 is axially located at a front end 44 of the slide 40 (see FIG. 3).

The main guide device moreover comprises a sliding part 45 integral with the mobile external structure 22.

With reference to FIG. 6, the sliding part 45 is connected to the mobile external structure 22 so as to extend radially outwards from this structure 22.

The sliding part 45 has a shape complementary to that of the rails 41 and 42 (see FIG. 5) allowing it to slide along the slide 40 when the mobile external structure 22 is moved between the closed and open positions, and ensuring thus the guiding of the mobile external structure 22 during such a movement.

Figure 5:
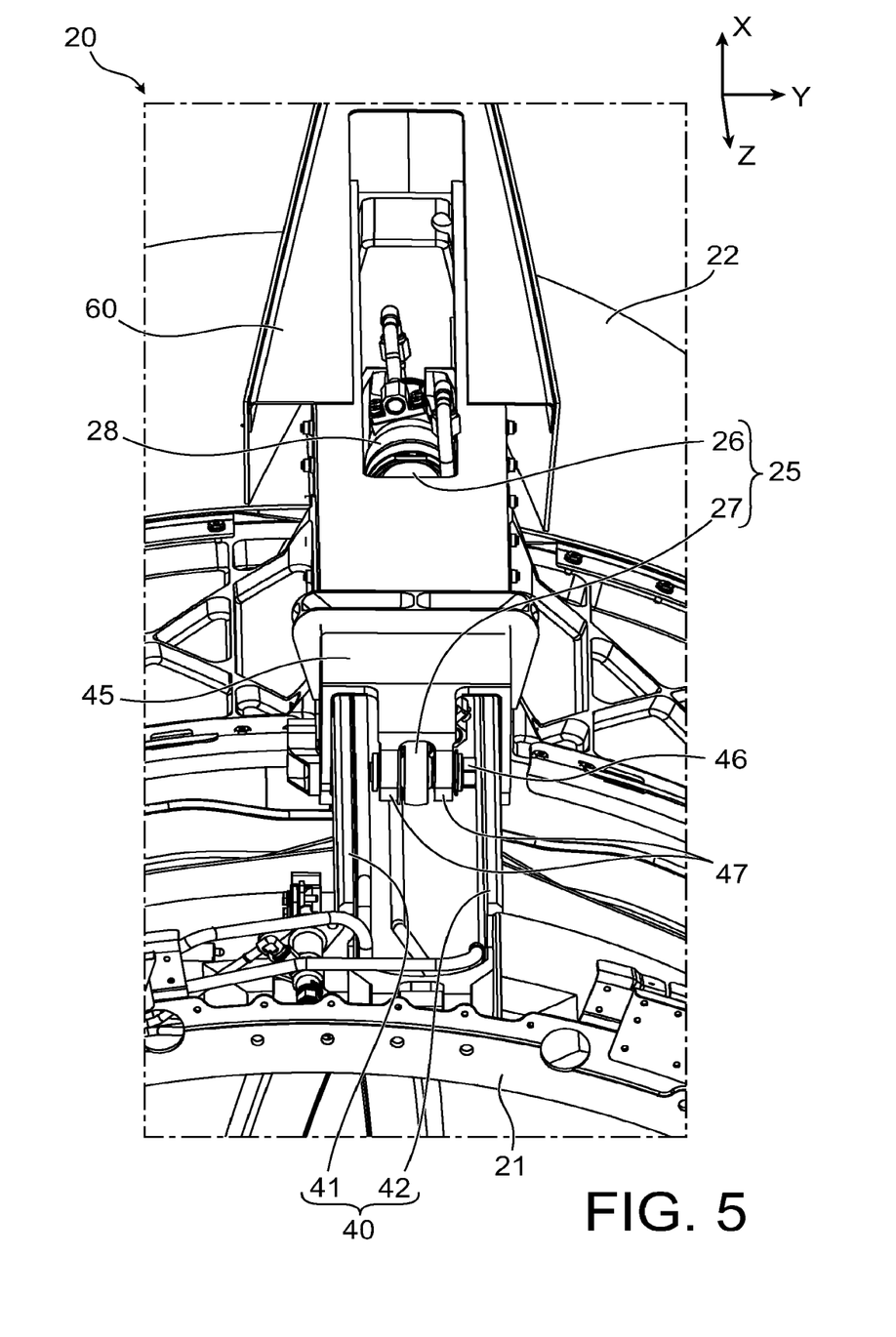
FIG. 5 is a schematic perspective view of the reverser of FIG. 3 in thrust reversal configuration, this figure showing a fairing element of a pylon as well as a sliding part of the main guide device.

With reference to FIG. 5, the sliding part 45 is in this example connected to the rod 27 of the actuator 25 by means of a drive shaft 46 extending perpendicularly relative to the activation shaft A2. The drive shaft 46 passes through both an orifice (not shown) made in said free end of the rod 27 and orifices (not shown) made in a connecting member 47 of the sliding part 45. The connecting member 47 here comprises two lugs extending on either side of the free end of the rod 27.

In the embodiment of FIGS. 3 to 7, the main guide device described above is unique, in the sense that it alone ensures the function of guiding the mobile external structure 22 during its movement between the closed and open positions.

The embodiment of FIG. 8 differs from that of FIGS. 3 to 7 only in that the guide function is performed simultaneously by a main guide device and an auxiliary guide device 50.

The main guide device is identical to the guide device described above with reference to the embodiment of FIGS. 3 to 7.

The auxiliary guide device 50 conventionally comprises rails integral with the fixed structure of the reverser 20 and a sliding part integral with the mobile external structure 22.

In order to locate the activator 25 and the guide device(s) of the embodiments described above relative to each other, FIG. 3 shows two median longitudinal planes P1 and P2.

Each of these fictitious planes is a median plane in the sense that it passes through the axis A1 which is a central axis of the reverser 20, and a longitudinal plane since the axis A1 is also a longitudinal axis parallel to the longitudinal direction Z.

With reference to FIG. 3, the plane P2 also passes through the activation axis A2 of the actuator 25, and the plane P1 is perpendicular to the plane P2.

Thus, the actuator 25 and the main guide device of the embodiment of FIGS. 3 to 7 are both located on the same side of the plane P1 and traversed by the plane P2.

As indicated above, the rails 41 and 42 are located on either side of the actuator 25 and therefore of the plane P2. Although none of these rails 41 and 42 is as such traversed by the plane P2, the main guide device, which comprises the two rails 41 and 42 and the sliding part 45, is as a whole traversed by the plane P2.

In the embodiment of FIG. 8, the actuator, the main guide device and the auxiliary guide device 50 are all three traversed by the plane P2, by analogy with what has just been described. Similarly, the actuator and the main guide device are both located on a first side of the plane P1. The auxiliary guide device is located on a second side of the plane P1, opposite the first side of this plane.

In an embodiment not shown, the reverser 20 is similar to that of the embodiment of FIGS. 3 to 7 and further comprises several auxiliary guide devices similar to the auxiliary guide device 50 of FIG. 8 but not traversed by the plane P2. For example, these auxiliary guide devices can be positioned symmetrically on said second side of the plane P1 and on either side of the plane P2.

With reference to FIG. 5, the activator 25 and the main guide device are in this example sheltered by a fairing 60 of a pylon (not shown in this figure) for attaching the propulsion unit 2 to the fuselage 3 of the aircraft 1, or more generally to a pylon for attaching the propulsion unit 2 to an aircraft.

The embodiments which have just been described are in no way limiting. For example, the reverser 20 may comprise end-of-travel stops (not shown) configured to axially hold the mobile external structure 22 in the open position. In one embodiment, one of these stops is located on the same side of the plane P1 as the activator 25 and is centred relative to the plane P2. The other stops can be positioned equidistant from each other so that each of them is traversed either by the plane P1 or by the plane P2.

The invention claimed is:

1. A thrust reverser for an aircraft propulsion unit, said thrust reverser comprising:
    a mobile annular external structure having a central longitudinal axis and being mobile in axial translation along the central longitudinal axis between a closed position, wherein said mobile annular external structure is capable of guiding a fluid flow in the aircraft propulsion unit so as to generate a thrust, and an open position wherein the mobile annular external structure releases, in front of the mobile annular external structure, a radial opening in which cascades are arranged, capable of evacuating a portion of said fluid flow from the aircraft propulsion unit so as to generate a counter-thrust, a main guide device arranged to guide the mobile annular external structure during movement of the mobile annular external structure between the closed and open positions, wherein said reverser comprising a single actuator configured to move the mobile annular external structure between the closed and open positions, the single actuator and the main guide device both being located on a same side of a first median longitudinal plane and traversed by a second median longitudinal plane perpendicular to the first median longitudinal plane, the single actuator extending along an activation axis substantially parallel to the central longitudinal axis and including a body forming a fixed portion of the single actuator and a rod forming a mobile portion of the single actuator, wherein the main guide device comprises a slide integral with one of the mobile annular external structure and a fixed structure of the reverser, the slide being configured to allow sliding of a sliding part integral with the other of the mobile annular external structure and the fixed structure along said slide when the mobile annular external structure is moved between the closed and open positions, wherein the slide comprises two rails between which the single actuator is housed, and the two rails extending on either side of the rod of the single actuator including when the single actuator is deployed.

2. The thrust reverser according to claim 1, wherein a fixed portion of the single actuator is connected to a rear end of the slide.

3. The thrust reverser according to claim 1, further comprising an auxiliary guide device arranged to guide the mobile annular external structure during movement of the mobile annular external structure between the closed and open positions.

4. The thrust reverser according to claim 3, wherein the auxiliary guide device is positioned on one side of the first median longitudinal plane opposite to the side where the single actuator is located, the auxiliary guide device being traversed by said second median longitudinal plane.

5. An aircraft propulsion unit, said propulsion unit comprising a thrust reverser according to claim 1.

6. The propulsion unit according to claim 5, comprising a pylon for attaching said propulsion unit to a wing or a fuselage of said aircraft, the pylon comprising a fairing sheltering the activator and the main guide device.

7. A thrust reverser for an aircraft propulsion unit, said thrust reverser comprising:

an annular external structure having a central longitudinal axis and being mobile in axial translation along the central longitudinal axis between a closed position, wherein said annular external structure is capable of guiding a fluid flow in the aircraft propulsion unit so as to generate a thrust, and an open position wherein the annular external structure releases, in front of the annular external structure, a radial opening in which cascades are arranged, capable of evacuating a portion of said fluid flow from the aircraft propulsion unit so as to generate a counter-thrust, a main guide device arranged to guide the annular external structure during movement of the annular external structure between the closed and open positions, and a single actuator configured to move the annular external structure between the closed and open positions, the single actuator and the main guide device both being located on a same side of a first median longitudinal plane and traversed by a second median longitudinal plane perpendicular to the first median longitudinal plane, the single actuator extending along an activation axis substantially parallel to the central longitudinal axis and including a body forming a fixed portion of the single actuator and a rod forming a mobile portion of the single actuator, the single actuator being configured to place the annular external structure in the open position when the single actuator is retracted and to place the annular external structure in the closed position when the single actuator is deployed, wherein the main guide device comprises a slide integral with one of the annular external structure and a fixed structure of the reverser, the slide being configured to allow sliding of a sliding part integral with the other of the annular external structure and the fixed structure along said slide when the annular external structure is moved between the closed and open positions, wherein the slide comprises two rails between which the single actuator is housed over an entire length of the slide, the body of the single actuator is connected to a first end of the slide, and the two rails extending on either side of the rod of the single actuator including when the single actuator is deployed, a free end of the rod being axially located at a second end of the slide when the single actuator is deployed, and wherein a shape of the sliding part is complementary to the two rails, and the sliding part is connected to the free end of the rod of the single actuator.

8. The thrust reverser according to claim 7, wherein the sliding part is connected to the rod of the single actuator by a drive shaft extending perpendicularly to the activation axis.

* * * * *